(12) United States Patent
Niwa

(10) Patent No.: US 7,980,564 B2
(45) Date of Patent: Jul. 19, 2011

(54) METAL FIXTURE FOR DUST COVER

(75) Inventor: Hidekazu Niwa, Makinohara (JP)

(73) Assignee: NOK Corporation (JP)

( * ) Notice: Subject to any disclaimer, the term of this patent is extended or adjusted under 35 U.S.C. 154(b) by 150 days.

(21) Appl. No.: 12/440,375

(22) PCT Filed: Oct. 5, 2007

(86) PCT No.: PCT/JP2007/069544
§ 371 (c)(1),
(2), (4) Date: Mar. 6, 2009

(87) PCT Pub. No.: WO2008/044624
PCT Pub. Date: Apr. 17, 2008

(65) Prior Publication Data
US 2010/0194059 A1   Aug. 5, 2010

(30) Foreign Application Priority Data
Oct. 13, 2006   (JP) .................. 2006-279796

(51) Int. Cl.
*F16J 15/52* (2006.01)
(52) U.S. Cl. ...................... 277/634; 277/922
(58) Field of Classification Search .................. 277/616, 277/630, 634, 637, 922
See application file for complete search history.

(56) References Cited

U.S. PATENT DOCUMENTS

| | | | | |
|---|---|---|---|---|
| 3,262,706 A | * | 7/1966 | Hassan | 464/175 |
| 3,322,445 A | * | 5/1967 | Hassan | 403/51 |
| 4,322,175 A | * | 3/1982 | Szczesny | 403/134 |
| 5,466,084 A | * | 11/1995 | Brueggen et al. | 403/134 |
| 5,649,779 A | * | 7/1997 | Martin et al. | 403/51 |
| 7,070,355 B2 | * | 7/2006 | Abels et al. | 403/50 |

FOREIGN PATENT DOCUMENTS

| | | |
|---|---|---|
| JP | 54-032649 | 3/1979 |
| JP | 54-118553 A | 9/1979 |
| JP | 59-158766 U | 10/1984 |
| JP | 62-015655 U | 1/1987 |
| JP | 04-028214 U | 3/1992 |
| JP | 08-303447 A | 11/1996 |

* cited by examiner

*Primary Examiner* — Shane Bomar
*Assistant Examiner* — Gilbert Y Lee
(74) *Attorney, Agent, or Firm* — Harness, Dickey & Pierce, P.L.C.

(57) ABSTRACT

To eliminate pins for specifying a vertical position of a metal fixture from a dust cover forming mold to suppress variation in product shape caused by wear of the pins, the ring-shaped metal fixture is embedded in the dust cover to fix the dust cover at an installation position, inner diameter teeth are formed integrally at one end in the axial direction of an outer diameter tube section via a bend, the metal fixture is embedded in the dust cover so that one end in the axial direction of the bend is set at axially the same position as one end face in the axial direction of the dust cover, and groove communication sections radially penetrating the bent section are formed in a radial shape at the one end.

1 Claim, 7 Drawing Sheets

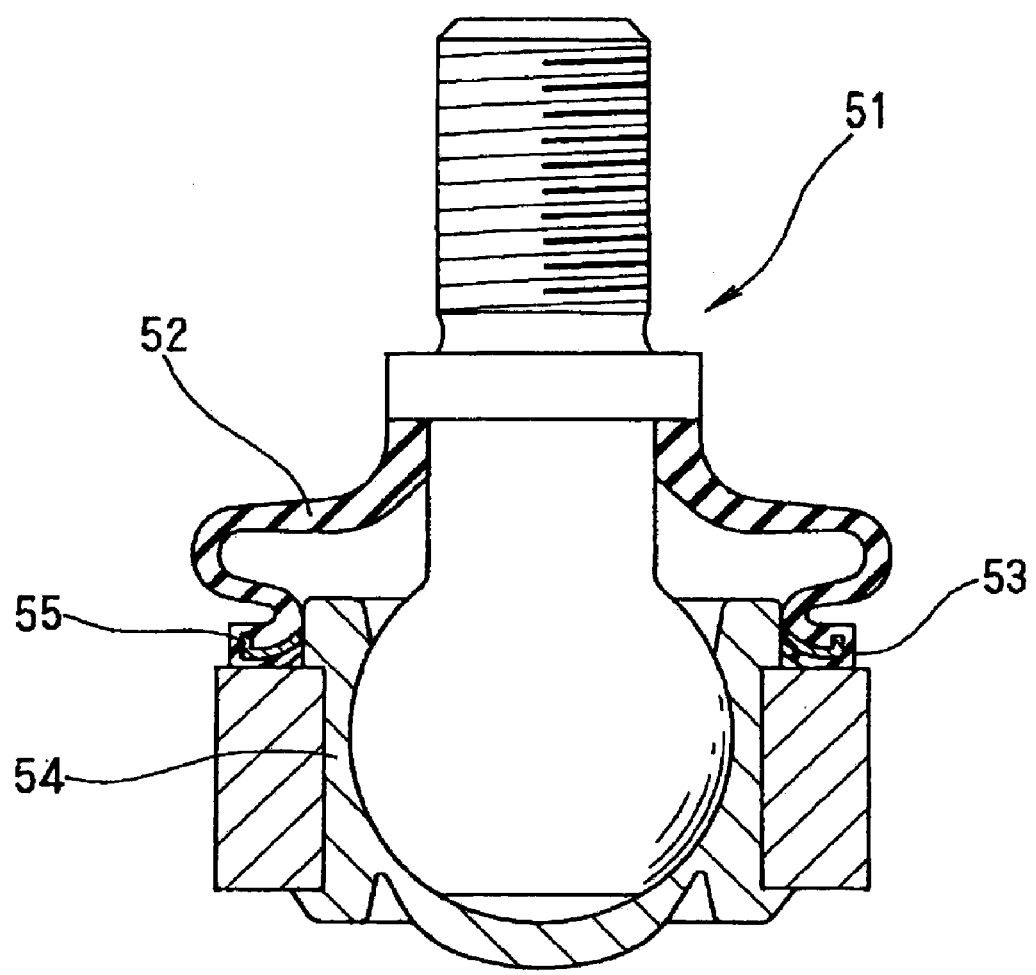

METAL FIXTURE FOR DUST COVER

CROSS-REFERENCE TO RELATED APPLICATIONS

This is a national stage of the International Application No. PCT/JP2007/069544 filed on Oct. 5, 2007 and published in Japanese language.

BACKGROUND OF THE INVENTION

1. Field of the Invention

The present invention relates to a metal fixture embedded in a dust cover for fixing the dust cover at an installation position.

2. Description of the Conventional Art

As illustrated in FIG. 6, a dust cover 52 is conventionally utilized for protecting a rocking operation part of a ball joint 51, and a metal fixture 55 for fixing the dust cover 52 to a joint socket 54, which is a counterpart for mounting, is embedded in a fixing section 53 at one end of the dust cover 52.

As illustrated in FIG. 7 (A) enlargedly, the metal fixture 55 is formed by pressing of a metal plate. Conical surface shaped inner diameter teeth 58, which are for setting a fitting tolerance with respect to the joint socket 54, are integrally formed at one end in the axial direction (at a lower end in the figure) of an outer diameter tube section 56 via a bend 57 in between (refer to Japanese Patent Application Laid-Open No. 8-303447 (FIG. 1)).

Further, as illustrated in FIG. 7 (B), the metal fixture 55 is inserted into a mold 59 at a time of forming of the dust cover 52 made of an elastic body by the mold 59, and embedded in the dust cover 52 at the same time of the forming of the dust cover 52 (an insert molding).

Furthermore, as illustrated in FIG. 7 (A), in a state of being embedded in the dust cover 52, the metal fixture 55 is embedded at a position retreated in the axial direction by a predetermined distance d from an end face 52a of the dust cover 52 in order to decrease an exposure area to outside air as much as possible. Thus, as illustrated in FIG. 7 (B), in order to fix the metal fixture 55 at a predetermined vertical position when the metal fixture is inserted into the mold 59, a plurality of pins 60 for specifying the vertical position of the metal fixture are erected on an inner face of the mold 59. Therefore, since the dust cover 52 is molded under the state that the metal fixture 55 is placed on the pins 60, a plurality of recessions 61, which are left after pulling-out of the pins 60, are formed on the end face 52a of the dust cover 52 when the molded dust cover 52 is taken out from the mold 59 after molding.

However, the aforementioned conventional technique has the following problems.

When the mold 59 is used for a long period of time, top ends of the pins 60 contact to the metal fixture 55 repeatedly so as to be worn gradually. Thus, completed products have variation in the metal fixture embedding position. Therefore, it takes much work, time, and cost to make maintenance of the mold 59 to prevent the variation. Since it is necessary to erect the pins 60 in the mold 59, a production cost of the mold 59 increases.

Further, in case of the structure that the pins 60 are erected in the mold 59 and the metal fixture 55 is placed on the pins 60, an axial-directional dimension $L_1$ of the dust cover fixing section 53 increases by the heights of the pins 60. Therefore, when the attaching space of the fixing section 53 is restricted, it is difficult to adjust the axial-directional dimension $L_1$.

Furthermore, Japanese Utility Model Publication No. 54-118553 (FIG. 2) discusses another conventional technique in which a bottom face of a metal fixture of a dust cover is formed in a shape waving in a circumference direction. However, when the metal fixture having such the shape is embedded in the dust cover so as to set the bottom face at the same position in the axial direction as one end face in the axial direction of the dust cover, many radial straight lines due to the waving shape are formed as metal exposure sections at the one end face in the axial direction of the dust cover. Therefore, according to this conventional technique, a metal exposure area with respect to a rubber surface should be increased, so that there is a problem that the metal fixture is corroded easily.

SUMMARY OF THE INVENTION

Problems to be Solved by the Invention

The present invention is to solve the aforementioned problems, and an object of the present invention is to provide such a metal fixture for a dust cover as to enable pins for specifying the vertical position of the metal fixture to be eliminated from a dust cover forming mold to suppress variation in the product shape caused by wear of the pins, to enable maintenance of the mold to be easier, to enable a production cost of the mold to be reduced, and to enable an axial dimension of a dust cover fixing section to be made small.

Means for Solving the Problems

In order to attain the aforementioned object, a metal fixture according to a first aspect of the present invention is a ring-shaped metal fixture embedded in a dust cover for fixing the dust cover at an installation position and has inner diameter teeth formed integrally at one end in the axial direction of an outer diameter tube section via a bend in between, wherein, the metal fixture is embedded in the dust cover so that one end in the axial direction of the bend is set at axially the same position as one end face in the axial direction of the dust cover, and groove-like communication sections radially penetrating the bend are formed in a radial shape at the one end in the axial direction of the bend.

Further, according to a second aspect of the present invention, the metal fixture for the dust cover described in the first aspect further has a structure that the groove-like communication sections, which are formed so as to radially penetrate through at the one end in the axial direction of the bend, penetrate the bend in the thickness direction and open also at an inner side end face of the bend.

The metal fixture of the present invention is made by integrally forming of the inner diameter teeth at the one end in the axial direction of the outer diameter tube section via the bend in between, and embedded in the dust cover so that the one end in the axial direction of the bend is set at axially the same position as the one end face in the axial direction of the dust cover. Therefore, the pins for specifying the vertical position of the metal fixture are eliminated from the mold for forming the dust cover in which the metal fixture is embedded.

Further, in the metal fixture of the present invention, the groove-like communication sections radially penetrating the bend are formed in a radial shape at the one end in the axial direction of the bend. Thus, a rubber (a dust cover forming material) on the outer diameter side of the metal fixture and a rubber on the inner diameter side are made continuous via the groove-like communication sections at a time of forming of the dust cover. Therefore, even if the pins are eliminated from the mold, a structure in which a rubber is continuously filled into the one end face side in the axial direction of the metal fixture can be attained.

Further, as for the continuous filling up of the rubber, the groove-like communication sections formed at the one end in the axial direction of the bend penetrate the bend in the thickness direction and open also at the inner side end face of the bend, in addition to that the groove-like communication sections are formed to radially penetrate at the one end in the axial direction of the bend as described in the second aspect. Thus, the rubber around the metal fixture is formed continuously in three directions.

Effectiveness of the Invention

The present invention has the following effects.

As for the metal fixture according to the first aspect of the present invention, as mentioned above, the inner diameter teeth are formed integrally with one end in the axial direction of the outer diameter tube section via the bend in between. Further, the metal fixture is embedded in the dust cover so that one end in the axial direction of the bend is set at axially the same position as one end in the axial direction of the dust cover. Thus, the pins for specifying the vertical position of the metal fixture are eliminated in a mold for forming the dust cover where the metal fixture is embedded. Therefore, variation in the product shape caused by wear of the pins can be suppressed, maintenance of the mold can be facilitated, a production cost of the mold can be reduced, and the axial dimension of the dust cover fixing section can be reduced. By the reduction of the axial dimension of the dust cover fixing section, the axial dimension can be adjusted easily, even when the attaching space is restricted.

Further, the groove-like communication sections radially penetrating the bend are formed in a radial shape at the one end in the axial direction of the bend. Thus, a rubber on the outer diameter side of the metal fixture and a rubber on the inner diameter side can be made continuous via the groove-like communication sections in between when forming the duct cover. Therefore, even if the pins are eliminated from the mold, a structure in which a rubber continuously filled to the one end face side in the axial direction of the metal fixture can be attained, so that the rubber (the dust cover) and the metal fixture are hardly separated.

Further, the groove-like communication sections formed in the bend of the metal fixture can function as strain releasing ports at the time of a bending process of the metal fixture or press insertion of the metal fixture into a housing which is its counterpart. Therefore, a crack or the like is hardly caused in the metal material at the time of the bending process or press insertion of the metal fixture. When the metal fixture is press inserted, a degree of freedom of tolerance can be increased.

Further, when the metal fixture is embedded in the dust cover so that the one end in the axial direction of the bend is set at axially the same position as the one end in the axial direction of the dust cover, the one end in the axial direction of the bend is exposed on the surface of the one end face in the axial direction of the dust cover. In this case, if the groove-like communication sections are not formed at the one end in the axial direction of the bend, the metal fixture is exposed on the surface in a circular line shape. However, in the present invention, since a plurality of the groove-like communication sections are formed at the one end in the axial direction of the bend, the metal fixture is exposed on the surface in an intermittent circular line shape in the circumference direction. Therefore, since the metal exposing area with respect to the rubber surface is made small, the metal fixture is hardly corroded.

Furthermore, as described in the second aspect, the groove-like communication sections, which are formed to radially penetrate through at the one end in the axial direction of the bend, penetrate the bend in the thickness direction and open also at the inner side end face of the bend. Thus, the rubber around the metal fixture is formed continuously in three directions, that is, over the outer diameter side, the inner diameter side, and the inner end face side of the metal fixture. Therefore, the adhesion strength of the rubber can be increased more.

BRIEF EXPLANATION OF DRAWINGS

FIG. 6 is a cross sectional view of a ball joint to illustrate a state of a metal fixture according to a conventional example being used, FIG. 7 (A) is a cross sectional view in a state of the metal fixture being embedded in a dust cover, and FIG. 7 (B) is a cross sectional view of a main part of a mold to illustrate a dust cover forming process.

DETAILED DESCRIPTION OF PREFERRED EMBODIMENTS

In addition, the present invention includes the following embodiments.

Structure

As a means for solving the aforementioned problems, through holes (communication sections) are formed at equal intervals in a bottom section (bend) of a metal ring (metal fixture). As for the metal ring, although an inner peripheral edge thereof is positioned at an inner peripheral face of a large diameter fixing section in order to keep a fitting tolerance with respect to a socket by a plate spring operation, cut sections are formed at equal intervals at an inner periphery of the metal ring so as to keep a flowing path of a rubber in order not to prevent flowing of the rubber at a time of forming. In an example described below, the position and number of the through holes agree with those of the cut sections. However, it is not necessary to agree their positions and their numbers, and the size and the number of the through holes can be properly decided considering the balance between the rubber adhesion strength and the metal ring strength.

Effectiveness

The pins of the mold can be eliminated, a cost for the mold and maintenance can be reduced, and a stable product having no variation can be provided. Since a part having a dimension d in a conventional product can be eliminated, an axial dimension can be adjusted easily. Since the rubber is made continuous via the through holes, a problem such as separation or the like hardly occurs. By forming the through holes in the bend of the metal ring, the through holes can function as strain releasing ports at the time of bending process of the metal ring and the effect for preventing forming of a crack or the like due to the bending can be expected.

Then, examples of the present invention will be described below with reference to the drawings.

Figure 1:
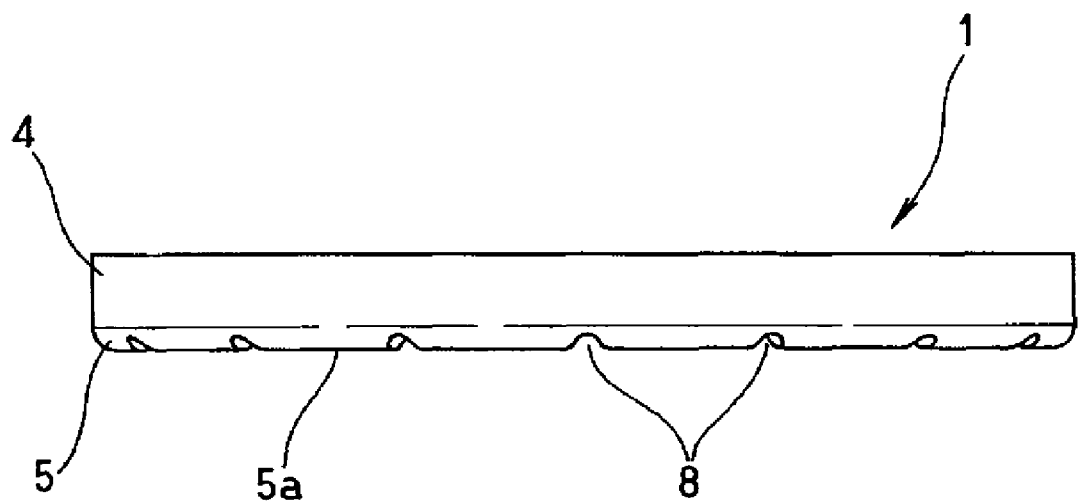
FIG. 1 is a front view of a metal fixture according to an example of the present invention.
Figure 2:
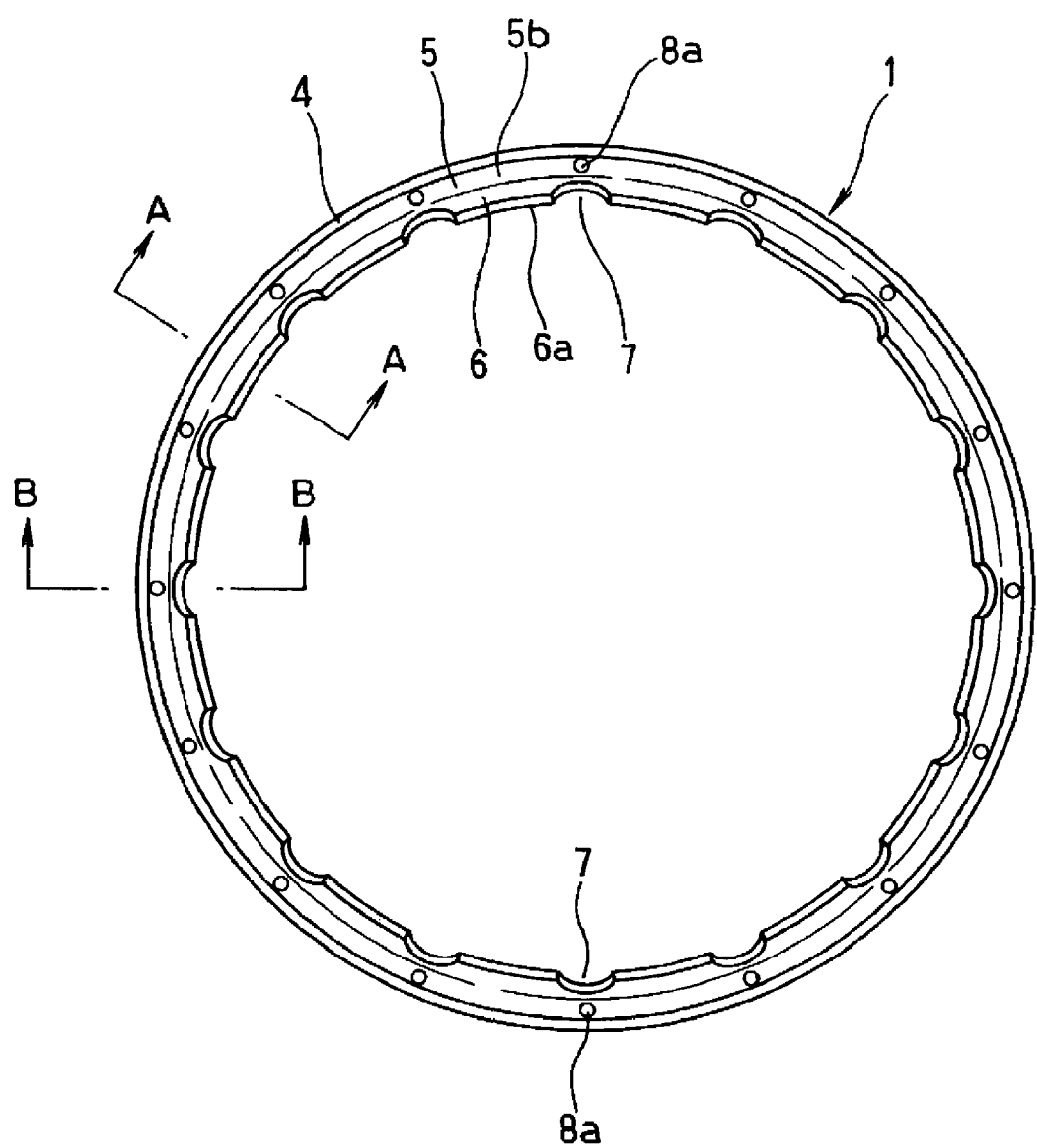
FIG. 2 is a plan view of the metal fixture.
Figure 3:
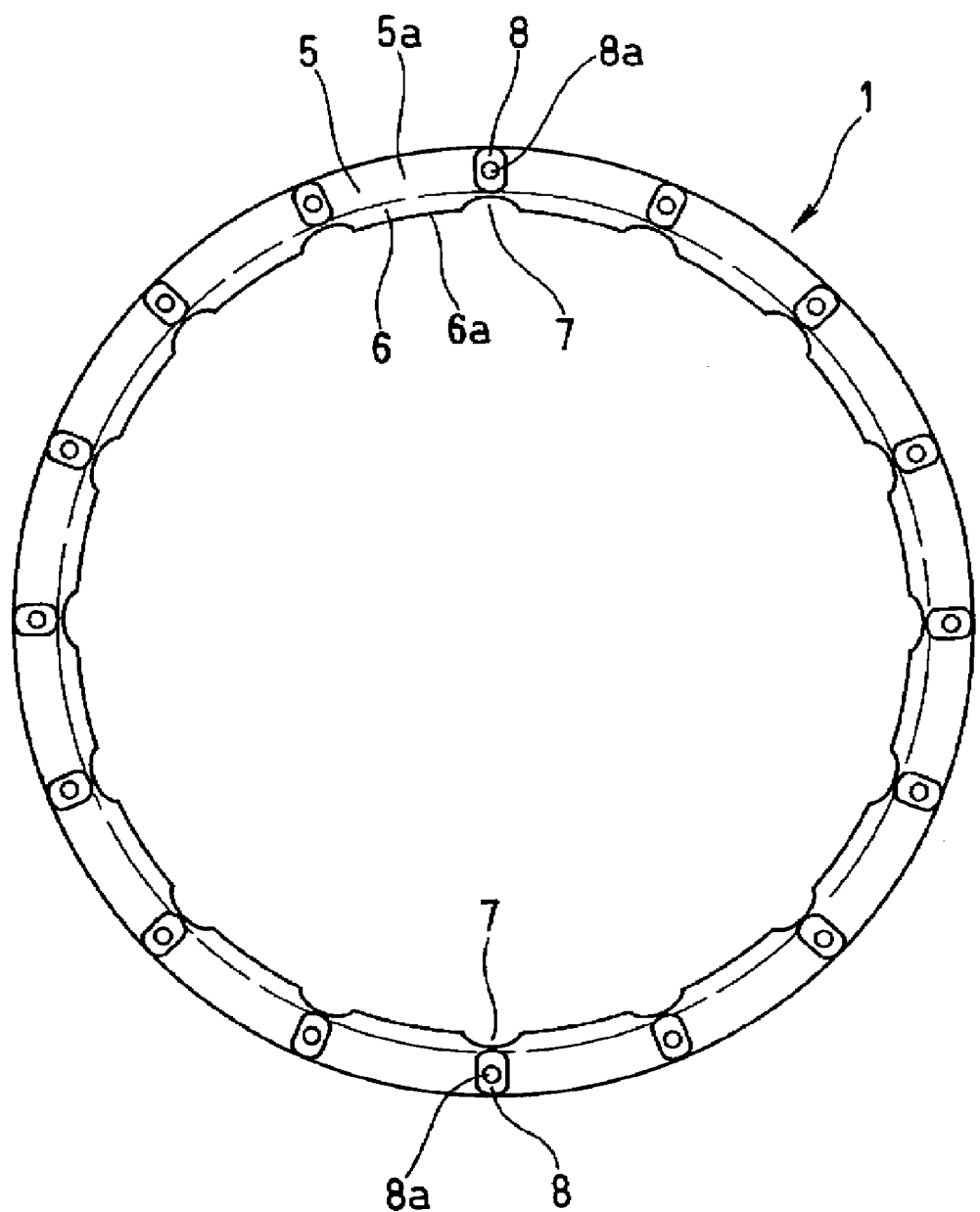
FIG. 3 is a bottom face view of the metal fixture, FIGS. 4 (A) and 4 (B) are cross sectional views of main parts of the metal fixture, among which FIG. 4 (A) is an expanded cross sectional view taken along the line A-A in FIG. 2, and FIG. 4 (B) is an expanded cross sectional view taken along the line B-B in FIG. 2, FIGS. 5 (A) and 5 (B) are cross sectional views in a state of the metal fixture being embedded in a dust cover, among which FIG. 5 (A) is a cross sectional view corresponding to FIG. 4 (A), and FIG. 5 (B) is a cross sectional view corresponding to FIG. 4 (B)
Figure 4A:
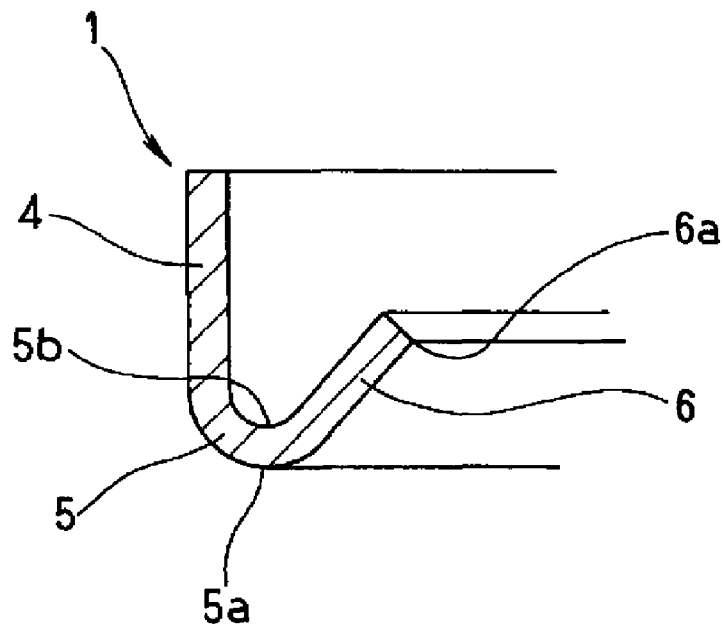
Figure 4B:
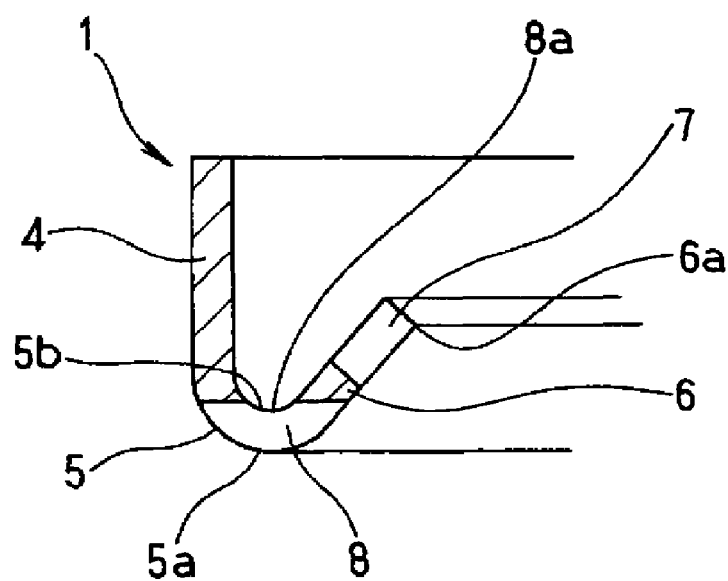
Figure 5A:
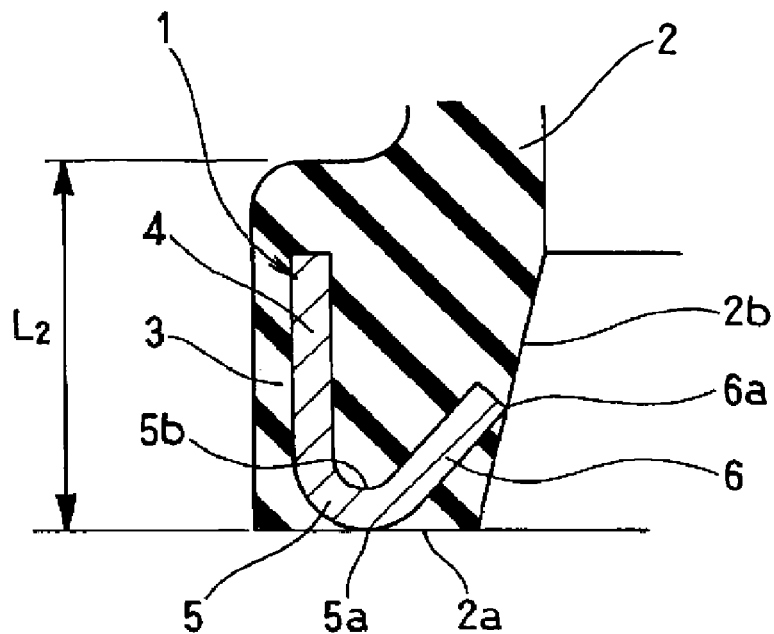
Figure 5B:
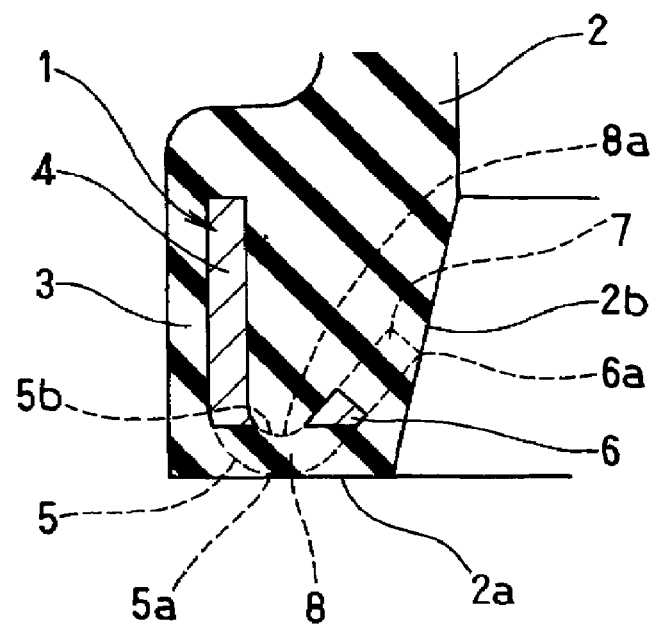

FIG. 1 is a front view of a metal fixture 1 according to an example of the present invention, FIG. 2 is a plan view of it, and FIG. 3 is a bottom face view of it. FIG. 4 (A) is an expanded cross sectional view taken along the line A-A in FIG. 2, and FIG. 4 (B) is an expanded cross sectional view taken along the line B-B in FIG. 2. FIGS. 5 (A) and 5 (B) are cross sectional views to illustrate a state of the metal fixture 1 being embedded in a dust cover 2.

The metal fixture 1 according to this example is embedded in a fixing section 3 (a large diameter fixing section) at one end of the dust cover 2 for a ball joint (the both are illustrated in FIGS. 5 (A) and 5 (B)) in order to fix the dust cover 2 to a joint socket (not illustrated, refer to FIG. 6) which is as a counterpart for mounting. The metal fixture 1 has the following configuration.

As illustrated in FIGS. 1 and 3, the metal fixture 1 is formed by pressing a metal plate (a ring-shaped flat steel plate), and has a ring shape as a whole. As illustrated in FIGS. 4 (A) and 4 (B), the metal fixture 1 includes an outer diameter tube section 4, and conical surface shaped inner diameter teeth 6 for setting a fitting tolerance with respect to the joint socket are integrally formed at one end in the axial direction (at a lower end in the figures) of an outer diameter tube section 4 via a bend 5 in between. Therefore, the metal fixture 1 has an approximately hook shaped or check mark "✓" shaped half cut cross section as a whole. In the figures, since the bend 5 is formed to have a circular arc shaped cross section, the metal fixture 1 is formed having a hook shaped cross section as a whole.

Figure 7A:
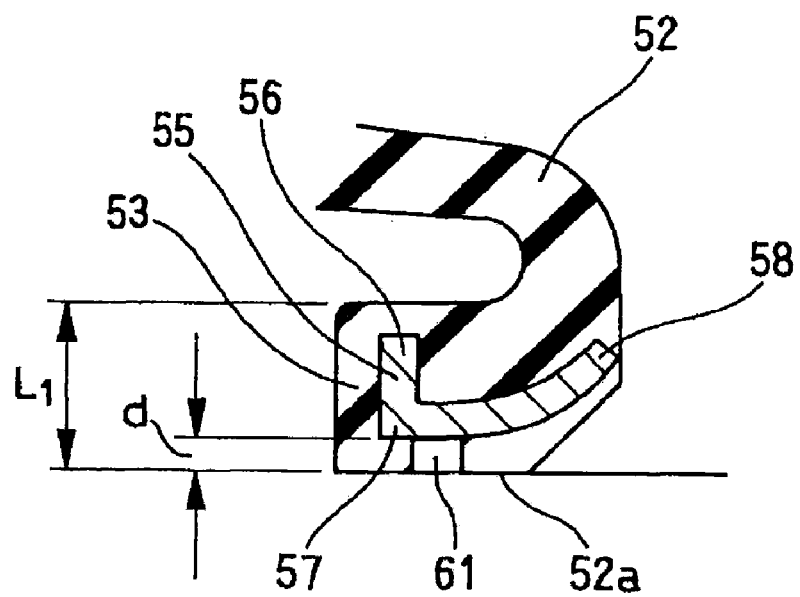
Figure 7B:
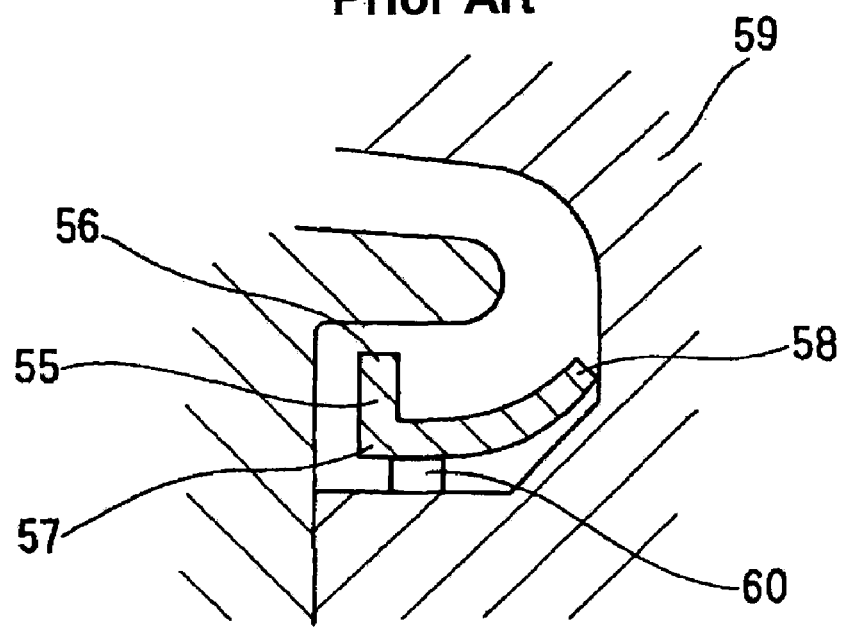

Further, as illustrated in FIGS. 5 (A) and 5 (B), the metal fixture 1 is embedded in the fixing section 3 of the dust cover 2 so that one end 5a in the axial direction of the bend 5 is set axially the same position as one end face 2a in the axial direction of the fixing section 3 of the dust cover 2. Therefore, pins for specifying the vertical position of the metal fixture are not provided in a mold (not illustrated, refer to FIG. 7) for forming a dust cover in which the metal fixture 1 is embedded, and the pins are eliminated.

Further, the metal fixture 1 is embedded in the fixing section 3 of the dust cover 2 so that inner diameter edges 6a of the inner diameter teeth 6 are set at the same position in the radial direction as an inner diameter face 2b of the fixing section 3 of the dust cover 2. Therefore, when an insert molding is executed while the metal fixture 1 is arranged in the mold for forming a dust cover, the inner diameter edges 6a of the inner diameter teeth 6 contact a cavity inner face of the mold so as to dam a flow of the rubber which is a material for forming the dust cover 2. Thus, in order not to dam the flow of the rubber, the inner diameter edges 6a of the inner diameter teeth 6 accompany a plurality of cut sections 7 on the circumference, where these cut sections 7 work as flowing paths of the rubber at the time of forming (sixteen cut sections 7 are formed at equal intervals in the figures). In addition, the cut sections 7 also function for elastically deforming the inner diameter teeth 6 easily when the dust cover 2 fits to the socket joint.

Groove-like communication sections 8 radially penetrating the bend 5 are formed in a radial shape at the one end 5a in the axial direction of the bend 5. That is, a plurality of the communication sections 8 are formed in the circumference direction (sixteen communication sections 8 are formed at equal intervals in the figures).

Further, the depth of the grooves of the communication sections is set to be larger than the thickness of the metal fixture 1 at the bend 5. Thus, each communication section 8 penetrates the bend 5 in the thickness direction and opens also at the inner side end face 5b of the bend 5. In the figures, the openings are denoted by a reference sign 8a.

The metal fixture 1 having the aforementioned configuration is embedded in the fixing section 3 at one end of the dust cover 2 by insert molding as shown in FIG. 5. When the dust cover 2 is mounted, the metal fixture 1 fixes the fixing section 3 at one end of the dust cover 2 to an outer peripheral stepped section of the joint socket by the fitting tolerance set in the inner diameter teeth 6. The metal fixture 1 is characterized in having the aforementioned configuration, and thereby achieving the following effects.

In the metal fixture 1 having the aforementioned configuration, the inner diameter teeth 6 are formed integrally at the one end in the axial direction of the outer diameter tube section 4 via the bend 5 in between. The metal fixture 1 is embedded in the dust cover 2 so that the one end 5a in the axial direction of the bend 5 is set at axially the same position as the one end face 2a in the axial direction of the dust cover 2. Thus, pins for specifying the vertical position of the metal fixture are eliminated in a mold for forming the dustcover 2 in which the metal fixture 1 is embedded. Therefore, all problems due to erection of the pins can be solved in advance. More particularly, variation in a product shape caused by wear of the pins can be suppressed, maintenance of the mold can be facilitated, a production cost of the mold can be reduced, and the axial dimension $L_2$ of the dust cover fixing section 3 can be reduced. If the axial dimension $L_2$ of the dust cover fixing section 3 is reduced, a degree of freedom of increasing/decreasing of the dimension expands when the attaching space is restricted. Thus, the axial dimension $L_2$ can be adjusted easily.

Further, since the groove-like communication sections 8 radially penetrating the bend 5 are formed in a radial shape at the one end 5a in the axial direction of the bend 5, the rubber at the outer diameter side of the metal fixture 1 and the rubber at the inner diameter side are made continuous via the groove-like communication sections 8 when the dust cover is formed. Thus, even if the pins are eliminated in the forming mold, a configuration for continuous filling of the rubber into the one end face side in the axial direction of the metal fixture 1 can be attained, so that the rubber (dust cover) and fixing metal are hardly separated. Thus the rubber is filled up in the groove-like communication sections 8 without a crevice.

Further, the groove-like communication sections 8 formed in the bend 5 of the metal fixture 1 can function as strain releasing ports at the time of bending process. Thus, the metal material hardly has a crack or the like during the bending process of the metal.

Furthermore, since the metal fixture 1 is embedded in the dust cover 2 so that the one end 5a in the axial direction of the bend 5 is set at axially the same position as the one end face 2a in the axial direction of the dust cover 2, the one end 5a in the axial direction of the bend 5 is thus exposed on the surface of the one end face 2a in the axial direction of the dust cover 2. In this case, if the groove-like communication sections 8 are not formed in the one end 5a in the axial direction of the bend 5, the metal fixture 1 is exposed on the surface in a circular line shape. However, in the present example, since a plurality of the groove-like communication sections 8 are formed at the one end 5a in the axial direction of the bend 5, the metal fixture 1 is exposed on the surface in an intermittent circular line shape in the circumference direction. Therefore, since the metal exposure area with respect to the rubber surface is small, the metal fixture 1 is hardly corroded.

Furthermore, the groove-like communication sections 8 formed at the one end 5a in the axial direction of the bend 5 penetrate the bend 5 not only in the radial direction but also in the thickness direction to open at the inner side end face 5b of the bend 5. Thus, the rubber around the metal fixture 1 is formed continuously in three directions (over the outer diameter side, the inner diameter side, and the inner side end face 5b side of the metal fixture 1). Therefore, the strength of the rubber adhesion structure for keeping the embedded metal fixture 1 can be increased more.

In addition, in the aforementioned example, the number of the groove-like communication sections 8 (including the openings 8a) is agreed with that of the cut sections 7, and the groove-like communication sections 8 are formed at positions agreed with those of the cut sections 7 on the circumference. However, it is not necessary that the number and the positions on the circumference of the communication sections 8 are agreed with those of the cut sections 7. The number and the positions on the circumference of the communication sections 8 can be properly decided in consideration of the balance between the rubber adhesion strength and the strength of the metal fixture 1. On the other hand, in a case that the positions on the circumference of the communication sections 8 and the cut sections 7 are agreed, when the diameter of the inner diameter teeth 6 of the metal fixture 1 are expanded at the time of press insertion of the metal fixture 1 into a housing (the joint socket) which is its counterpart, the communication sections 8 work as strain releasing ports. Thus, there is an effect that the bend 5 is hardly deformed plastically.

Further, regardless of the existence of the cut sections 7, by forming of the groove-like communication sections 8 (including the opening 8a) in the bend 5, when the diameter of the inner diameter teeth 6 of the metal fixture 1 are expanded at the time of press insertion of the metal fixture 1 into the counterpart housing (the joint socket), the communication sections 8 work as strain releasing ports. Thus, there is the effect that the bend 5 is hardly deformed plastically. Furthermore, even when the dimensional accuracy of the counterpart housing is low and a fitting tolerance is excessive, the metal fixture 1 can be fitted without plastic deformation of the bend 5 (a degree of freedom to set the fitting tolerance expands).

What is claimed is:

1. A metal fixture embedded in a dust cover for fixing the dust cover at an installation position, the metal fixture comprising:

an outer diameter tube section; and an inner diameter teeth section formed integrally with the outer diameter tube section at one end in an axial direction via a bend therebetween, the inner diameter teeth section having a conical surface shape as a whole, wherein the metal fixture is ring-shaped and embedded in the dust cover so that the one end in an axial direction of the bend is set at axially the same position as one end face in the axial direction of the dust cover, wherein the bend includes through-holes in the form of a plurality of spaced apart discrete grooved-shaped communication sections radially penetrating the bend in a radial shape at the one end in the axial direction of the bend and also penetrating the bend in a thickness direction so that each communication section opens at an inner end face of the bend, and wherein the inner diameter teeth section has a continuous ring shape as a whole adjacent the bend.

* * * * *